R. STECK.
ELECTRICAL SYSTEM.
APPLICATION FILED OCT. 26, 1920.
1,426,925.
Patented Aug. 22, 1922.
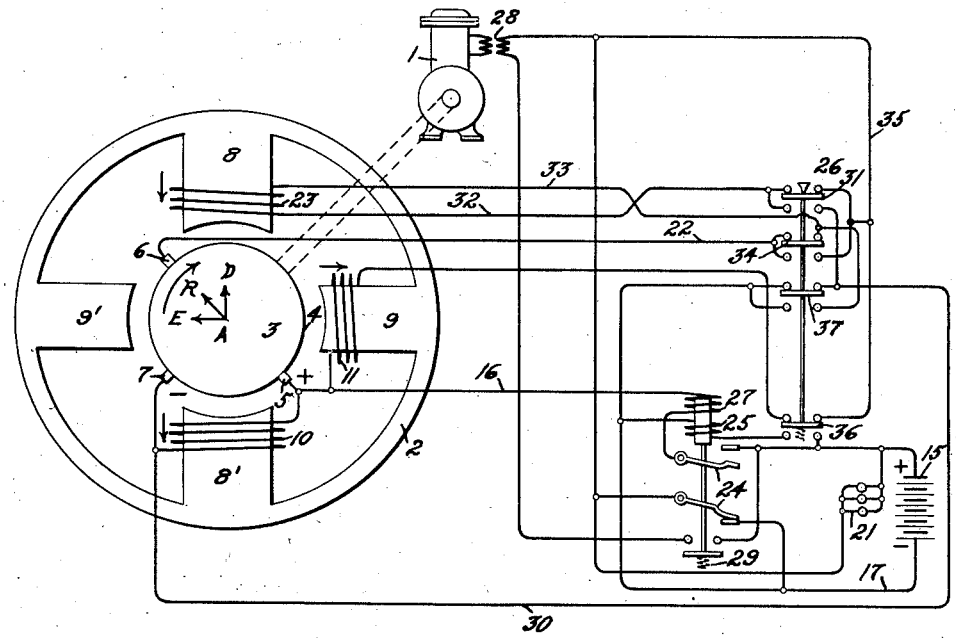
Inventor:
Robert Steck,
by *Ausr G. Davis*
His Attorney.

UNITED STATES PATENT OFFICE.

ROBERT STECK, OF FORT WAYNE, INDIANA, ASSIGNOR TO GENERAL ELECTRIC COMPANY, A CORPORATION OF NEW YORK.

ELECTRICAL SYSTEM.

1,426,925.  Specification of Letters Patent.  Patented Aug. 22, 1922.

Application filed October 26, 1920. Serial No. 419,689.

*To all whom it may concern:*

Be it known that I, ROBERT STECK, a citizen of the United States, residing at Fort Wayne, in the county of Allen, State of Indiana, have invented certain new and useful Improvements in Electrical Systems, of which the following is a specification.

My invention relates to electrical systems and particularly to systems in which a plurality of translation circuits are supplied with electrical energy from a single dynamo electric machine.

My invention is an improvement on the electrical system shown in my copending application, Serial No. 419,688 filed October 26, 1920, and assigned to the same assignee as this application. In my copending application there is disclosed an electrical system commonly known as a farm lighting system, which comprises a power and lighting circuit, a storage battery adapted to supply energy to said circuit, an internal combustion engine and a dynamo electric machine arranged to operate as a motor to crank the engine, and to be driven by the engine to supply current to charge the battery and to supply current to the power and lighting circuit while the battery is being charged.

In the system shown in my copending application, the dynamo electric machine is arranged and constructed so that the voltage impressed upon the power and lighting circuit remains constant irrespective of the load upon this circuit and the amount of current being supplied to the battery, and so that the voltage impressed upon the battery terminals varies so as to give the battery a suitable taper charge. In the arrangement as shown, however, the dynamo electric machine requires a relatively large amount of copper in its field windings and therefore the machine has a relatively high copper loss and therefore a corresponding low efficiency.

One object of my invention is to provide in an electrical system of the type referred to, a dynamo electric machine arranged and constructed so that the copper loss in the field windings is small while the machine is operating as a generator and so that the voltage impressed upon the power and lighting circuit remains constant irrespective of the load upon this circuit and the amount of current being supplied to the battery, and so that the voltage impressed across the battery terminals which is higher than that impressed across the power and lighting circuit varies so as to give the battery a suitable taper charge.

My invention will be better understood from the following description taken in connection with the accompanying drawing, and its scope will be pointed out in the appended claims.

Referring to the drawing, 1 represents a prime mover, such as any of the well-known types of internal combustion engines, connected to a dynamo electric machine 2 which is adapted to operate either as a generator or as a motor. This machine is provided with an armature 3 having a two pole armature winding wound thereon, a commutator 4 on which bear the brushes 5 and 6, which are spaced 180 electrical degrees apart, and a third brush 7 located between the 180 degree brushes and a field magnet structure having two sets of mechanical field poles 8—8′ and 9—9′ surrounding the armature 3. It will be observed that the number of mechanical field poles is twice the number of poles of the armature winding, and this relation may be broadly expressed by saying that the machine has an $n$-pole armature and a field structure having $2n$ mechanical poles. The mechanical field poles are arranged in two sets with an equal number of poles in each set and so that certain adjacent poles of the sets are of like polarity. In the arrangement shown, the poles 8—8′ are excited by the exciting winding 10 which is connected across the brushes 5 and 7, and the field poles 9—9′ are excited by the exciting winding 11 which is connected across the brushes 5 and 6. These windings are so arranged that the poles 8 and 9′ and the poles 8′ and 9 are of like polarity. In order to simplify the drawing, the exciting windings for each set of poles are shown on only one pole of the set, but in the machine as actually constructed the windings are preferably equally distributed on all the poles of the set. The brushes 5, 6 and 7 and sets of poles 8—8′ and 9—9′ are so arranged with respect to each other that the voltage between the brushes 5 and 7 depends upon the flux in the set of poles 8—8′ only, and the voltage between the 180 degree brushes 5 and 6 depends upon the flux in both sets of poles. Since the poles 8 and 9′ are of like polarity and the poles 8′ and 9 are of like polarity, the voltage between the brushes 5 and 6 is equal to the difference between the voltage generated between brushes 5 and 7 and the voltage generated between brushes 6 and 7. The armature winding is so arranged that when the armature 3 is rotated in the direction indicated by the arrow the brush 5 is the positive brush and the current flowing through the armature winding between brushes 5 and 6 produces a cross-magnetizing magnetomotive force AR which is substantially in line with the brushes 5 and 6 and which may be resolved into two components, AD which is in opposition to the magnetomotive force set up in the set of poles 8—8' by the exciting winding 10, and AE which is in opposition to the magnetomotive force set up in the set of poles 9—9' by the exciting winding 11. The current flowing through the armature winding between the brushes 5 and 7 only also produces a cross-magnetizing magnetomotive force in line with the component AE of the cross-magnetizing magnetomotive force AR. The polar arc embraced by the set of poles 8—8' is considerably greater than that embraced by the set of poles 9—9', as the voltage required to be developed between the brushes 5 and 7 is considerably greater than that required to be developed between brushes 6 and 7. Therefore, the voltage between brushes 5 and 6 is equal to the voltage generated between brushes 5 and 7 minus the voltage developed between brushes 7 and 6.

15 represents a storage battery which is adapted to be charged with current supplied through conductors 16 and 17, which are connected to the brushes 5 and 7 respectively. A power and lighting circuit 21 which requires a substantially constant voltage to be impressed thereon and which is shown as a lamp circuit, is connected so as to be supplied with current from the battery 15 when the battery is not being charged and to be supplied with current from the dynamo electric machine 2 through conductors 16 and 22, which are connected to the brushes 5 and 6 respectively, when the battery is being charged. A field winding 23, which is connected in series with conductor 22 when the machine is operating as a generator, is provided on the set of poles 8—8' and arranged to produce therein a magnetomotive force in the same direction as magnetomotive force of the exciting winding 10.

Since the voltage generated between the brushes 5 and 6 is equal to the voltage between the brushes 5 and 7 minus the voltage between the brushes 7 and 6, it will be evident that the voltage impressed upon the lamp circuit 21 is less than that impressed upon the battery 15.

Any suitable means may be provided for controlling the starting and stopping of the engine 1 and the connections between the battery 15, the power and lighting circuit 21 and the dynamo electric machine 2. The particular arrangement shown, comprises an automatic switch 24 having a shunt winding 25, which is adapted to be connected across the battery by a manually operated starting switch 26, and a series winding 27 connected in series with the conductor 16. The switch 24 in its open position completes a circuit connecting the power and lighting circuit 21 directly across the battery 15. In the closed position of the automatic switch this circuit is broken and the circuits between the brushes 5 and 6 and the power and lighting circuit 21 and between the brushes 5 and 7 and the battery 15 are completed in a manner hereinafter described. A circuit for the ignition coil 28 of the engine is also completed across the conductors 16 and 22 when the switch 24 is closed. A spring 29 is provided to restore the switch to its open position when the windings 25 and 27 are deenergized.

The operation of the system shown in the drawing is as follows: When the engine is idle the apparatus occupies the position shown in the drawing and current is supplied from the battery 15 directly to the power and lighting circuit 21 through contacts of the switch 24. When it is desired to run the machine 2 to supply current to charge the battery 15 the starting switch 26 is closed, thereby allowing current to flow from the positive side of the battery 15 through the lower contacts of the interlock 36 on the switch 26, the shunt winding 25 of the automatic switch 24 to the negative side of the battery. Switch 24 thereupon closes and completes a circuit from the positive side of the battery 15 through the series winding 27 of the automatic switch 24, conductor 16, brush 5, field winding 10 and armature winding of the dynamo electric machine 2 between brushes 5 and 7 in multiple, conductor 30, lower contacts of the interlock 31 on switch 26, conductor 32, series field winding 23, conductor 33, lower contacts of the interlock 37 on switch 26, conductor 17 to the negative side of the battery. Current also flows from the positive side of the battery 15 through the power and lighting circuit 21 and the ignition circuit 28 in multiple, conductor 35, lower contacts of the interlock 34 on the starting switch 26, conductor 22, brush 6, armature winding between brushes 6 and 7, conductor 30 to the negative side of the battery over the circuit previously described. The flux produced in the set of poles 8—8' is greater than that produced in the poles 9—9' and therefore the torque produced by the current flowing in the armature winding between the brushes 5 and 7 will cause the machine to operate as a motor to crank the engine. With the series field winding 23 connected in series with the conductor 22 and wound so as to act accumulatively with the exciting winding 10 when the machine is acting as a generator, it is evident that this winding 23 will also act accumulatively with the exciting winding 10 while the machine is operating as a motor if there is any load connected to the power and lighting circuit. It is possible, however, by a change in connections of the series field winding 23 while the machine is acting as a motor to produce a desirable increase in cranking torque. In the arrangement illustrated, the starting switch 26 is arranged to disconnect the series field winding 23 from the conductor 22 and to connect it in series with the conductor 17 when it is moved from its open to its closed position, so that the current supplied to the power and lighting circuit and to the machine for operating it as a motor flows through the field winding 23 in the proper direction to increase the flux in the set of poles 8—8' thereby causing the machine to operate as a compound motor. Any other suitable means may be provided for changing the connections of the machine so as to increase the cranking torque thereof. It will be observed that if while the machine is operating as a motor there is a load connected to the power and lighting circuit, the current flowing from the positive side of the battery 15 through the power and lighting circuit 21, conductor 35, lower contacts of the interlock 34 on the starting switch 26, conductor 22, brush 6, armature winding between brushes 6 and 7, brush 7, conductor 30, lower contacts of the interlock 31 on switch 26, conductor 32, series field winding 23, conductor 33, lower contacts of the interlock 37 on switch 26, conductor 17 to the negative side of the battery, produces a counter-torque. In order to reduce this counter-torque, it is desirable to open the circuit of the exciting winding 11. This may be accomplished by means of contacts on the starting switch 26 as shown.

When the engine begins to operate, the speed of the armature increases and the machine acts as a generator to supply current to the power and lighting circuit 21 and to the battery 15. The voltage developed between the brushes 5 and 6 which is equal to the voltage developed between the brushes 5 and 7 minus the voltage developed between the brushes 6 and 7 is impressed upon the power and lighting circuit 21 and the voltage developed between brushes 5 and 7 is impressed upon the battery 15.

The engine is preferably provided with governing means of any suitable type whereby the speed thereof remains substantially constant.

As soon as the machine 2 begins to operate as a generator current flows through the series winding 27 of the automatic switch 24 so that it acts accumulatively with the shunt winding 25. The starting switch 26, which is held in its closed position while the engine is being started may then be released and the automatic switch will remain in its closed position as long as the current through the coil 27 exceeds a predetermined value. The shunt coil 25 is so designed that the ampere turns thereof exceeds the ampere turns of the coil 27 while the battery is supplying current to the machine to operate it as a motor, thereby keeping the switch 24 closed during this operation. The opening of the switch 26 disconnects the field winding 23 from the conductor 17 and connects it in series with conductor 22 so that the current flowing through the field winding varies with the current supplied to the power and lighting circuit. The circuit of the field winding 11 is also completed across the brushes 5 and 6.

In order to give the battery a suitable taper charge, I connect the exciting winding 10 on the set of poles 8—8' across the brushes 5 and 7 which are connected to the battery 15. By so connecting the field winding 10 the battery charging characteristic of the machine is essentially that of a shunt wound generator. Since the battery potential gradually increases as the charge of the battery increases, the current input to the battery falls off thereby causing the resistance drop of the armature winding between brushes 5 and 7 to decrease as the charge of the battery increases. Consequently, the voltage between brushes 5 and 7 increases, as the battery current decreases, at such a rate as to give the battery a suitable taper charge.

The voltage impressed on the power and lighting circuit 21 while the machine is operating as a generator is maintained practically constant by the negative boosting effect of the set of poles 9—9'. The cross-magnetizing magnetomotive force in line with this set of poles due to the current flowing in the battery circuit is in opposition to the magnetomotive force of the exciting winding 11. As the charging current decreases due to the increase in battery potential, the magnitude of the cross-magnetizing magnetomotive force, due to the battery current, decreases thereby resulting in an increase in the total flux in the set of poles 9—9'. This increase in flux increases the voltage between the brushes 6 and 7. Since the voltage developed between brushes 6 and 7 is subtracted from the voltage developed between brushes 5 and 7, the machine is so designed that the increase in voltage developed between brushes 6 and 7 counteracts the increase in voltage developed between brushes 5 and 7 due to the decrease in the battery charging current, and, therefore, the voltage across the brushes 5 and 6 which is impressed upon the power and lighting circuit 21 remains constant irrespective of the amount of current supplied to the battery 15. It will be evident also that since the flux in the set of poles 9—9' decreases as the current supplied to the power and lighting circuit 21 increases thereby decreasing the negative boosting effect of the poles 9—9' so as to compensate for the resistance drop in the machine, that the voltage across the brushes 5 and 6 remains constant irrespective of the load on the power and lighting circuit 21.

In order to counteract the effect of the component AD of the cross-magnetization and to compensate for the resistance drop in the machine produced by current flowing in the power and lighting circuit 21, I provide the series field winding 23 on the set of poles 8—8'. By so connecting the winding 23, the amount of flux in the set of poles 8—8' is independent of the load connected to the power and lighting circuit 21.

It will be observed that the exciting winding 11 of the set of poles 9—9' is connected across the brushes 5 and 6 which are connected to the power and lighting circuit 21. Since the voltage impressed upon this circuit is constant the magnetomotive force of the exciting winding 11 is also constant.

As the charge of the battery 15 increases current through the series coil 27 of the switch 24 decreases until a point is reached where the spring 29 overpowers the magnetic pull of the winding 27. Switch 24 thereupon opens and disconnects the positive brush 5 from the battery 15 and the power and lighting circuit 21. Switch 24 also opens the circuit of the ignition coil 28 to stop the engine 1 and connects the power and lighting circuit 21 directly across the battery 15 thereby restoring the apparatus to its idle condition.

It is apparent that while I have shown and described only one embodiment of my invention, various modifications and changes may be made without departing from the spirit of my invention, and, therefore, I desire to cover in the appended claims all such modifications and variations which fall within the true spirit and scope of my invention.

What I claim as new and desire to secure by Letters Patent of the United States, is:

1. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a plurality of translation circuits connected to said brushes, one of said translation circuits being connected across said 180 degree brushes, another of said translation circuits being connected to be supplied at the voltage induced by one of said sets of poles only, a winding connected across one pair of said brushes and arranged to excite one of said sets of poles only, and a winding connected across another pair of said brushes and arranged to excite the other of said sets of poles only.

2. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a plurality of translation circuits connected to said brushes, one of said translation circuits being connected across said 180 degree brushes, another of said translation circuits being connected to be supplied at the voltage induced by one of said sets of poles only, a winding connected across said last mentioned translation circuit and arranged to excite the set of poles inducing the voltage supplied to said last mentioned translation circuit, and another winding connected across the other translation circuit and arranged to excite the other set of poles.

3. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles arranged so that the direction of the flux in both sets of poles causes the sets of poles to induce in the armature winding between said 180 degree brushes electromotive forces opposing each other, a translation circuit connected across said 180 degree brushes, a second translation circuit connected to be supplied at the voltage induced by one of said sets of poles only, said machine being constructed and arranged so that the magnetomotive force produced in the other set of poles by the cross-magnetizing magnetomotive force due to load current in said last mentioned translation circuit is in opposition to the magnetomotive force of the exciting winding on said set of poles.

4. An electrical system comprising an inherently regulated self-excited dynamo electric machine having an $n$ pole armature winding, and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a plurality of translation circuits connected to said brushes, one of said translation circuits being connected across said 180 degree brushes, another of said translation circuits being connected to be supplied at the voltage induced by one of said sets of poles only, a winding connected across said last mentioned translation circuit and arranged to excite the set of poles inducing the voltage supplied to said last mentioned translation circuit, and another winding connected across the other translation circuit and arranged to excite the other set of poles, said machine being constructed and arranged so that the magnetomotive force produced in the last mentioned set of poles by the cross magnetizing magnetomotive force due to the load current in said second mentioned translation circuit is in opposition to the magnetomotive force produced in said set of poles by the exciting winding therefor.

5. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a plurality of translation circuits connected to said brushes one of said translation circuits being connected across said 180 degree brushes, another of said translation circuits being connected to be supplied at the voltage induced by one of said sets of poles only, a winding connected across said last mentioned translation circuit and arranged to excite the set of poles inducing the voltage supplied to said last mentioned translation circuit, and another winding connected across the other translation circuit and arranged to excite the other set of poles, said windings being so arranged that the direction of flux in said sets of poles is such as to cause them to induce in the armature winding between the 180 degree brushes electromotive forces opposing each other, said machine being constructed and arranged so that the magnetomotive force produced in the last mentioned set of poles by the cross magnetizing magnetomotive force due to the load current in said second mentioned translation circuit is in opposition to the magnetomotive force produced in said set of poles by the exciting winding therefor.

6. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles arranged so that the direction of the flux in both sets of poles causes the sets of poles to induce in the armature winding between said 180 degree brushes electromotive forces opposing each other, a translation circuit connected across said 180 degree brushes, a second translation circuit connected to be supplied at the voltage induced by one of said sets of poles only, said machine being constructed and arranged so that the magnetomotive force produced in the last mentioned set of poles by the cross magnetizing magnetomotive force due to the load currents in the armature winding is in opposition to the magnetomotive force produced in said set of poles by the exciting winding therefor, and a winding connected in series with said first mentioned translation circuit and arranged to produce in said set of poles last mentioned a magnetomotive force in opposition to the magnetomotive force produced therein by the cross magnetizing magnetomotive force.

7. An electrical system comprising an inherently regulated self-excited dynamo electric machine having an $n$ pole armature winding and a field structure comprising $2n$ mechanical field poles arranged in two sets with an equal number of poles in each set, certain adjacent poles of the separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, an exciting winding for each set of poles arranged so that the direction of the flux in both sets of poles causes the sets of poles to induce in the armature winding between said 180 degree brushes electromotive forces opposing each other, a translation circuit connected across said 180 degree brushes, a second translation circuit connected to be supplied at the voltage induced by one of said sets of poles only, said machine being constructed and arranged so that the magnetomotive force produced in the last mentioned set of poles by the cross magnetizing magnetomotive force due to the load current in the armature winding is in opposition to the magnetomotive force produced in said set of poles by the exciting winding therefor, and the magnetomotive force produced in the other set of poles by the cross magnetizing magnetomotive force is in opposition to the magnetomotive force produced therein by the exciting winding therefor, and a winding connected in series with said first mentioned translation circuit and arranged to produce in said set of poles last mentioned a magnetomotive force in opposition to the magnetomotive force produced therein by the cross magnetizing magnetomotive force.

8. An electrical system comprising an inherently regulated dynamo electric machine having an $n$ pole armature winding and a field structure comprising $2n$ mechanical field poles arranged in two sets with an equal number of poles in each set, adjacent poles of separate sets being arranged to be of like polarity, at least three brushes cooperating with said armature, two of said brushes being spaced substantially 180 electrical degrees apart and arranged with respect to said poles so that the voltage between said brushes is dependent on the flux in both of said sets of poles, the third brush being arranged with respect to said poles so that the voltage between said third brush and one of said 180 degree brushes is dependent on the flux in one only of said sets of poles, a plurality of translation circuits connected to said brushes, one of said translation circuits being connectd to be supplied at the voltage induced by said one set of poles only, another of said translation circuits being connected across said 180 degree brushes, a winding connected across one of said translation circuits and arranged to excite said one set of poles only, the other set of poles being arranged to have the flux therein controlled by the cross magnetization.

In witness whereof, I have hereunto set my hand this twenty-third day of October, 1920.

ROBERT STECK.